Dec. 16, 1969  E. M. MURLEY, JR  3,484,685
METAL CLOSURE DETECTION IN CLOSED CARTONS
Filed May 23, 1966  2 Sheets-Sheet 1

INVENTOR.
ELLSWORTH M. MURLEY, JR.
BY
ATTORNEYS

United States Patent Office

3,484,685
Patented Dec. 16, 1969

3,484,685
METAL CLOSURE DETECTION IN CLOSED CARTONS
Ellsworth M. Murley, Jr., Toledo, Ohio, assignor to Owens-Illinois, Inc., a corporation of Ohio
Filed May 23, 1966, Ser. No. 552,067
Int. Cl. G01r 27/04
U.S. Cl. 324—58.5                                           10 Claims

ABSTRACT OF THE DISCLOSURE

The detection of whether or not containers, which are enclosed in a carton, have metal closures on the end thereof, wherein microwave radiation in the X-band is focused and beamed through the carton wall onto the ends of the containers and reflected radiation is picked up outside the carton when the closures are present.

---

This invention relates to a method and apparatus for detecting the presence or absence of metal closures on containers.

More specifically, this invention relates to a method and apparatus for inspecting closed cardboard cartons in which containers are packaged, for determining whether the containers have metallic end closures thereon and positioned in predetermined relationship.

When gallon glass containers, for example containers used to ship syrup, are manufactured, they are provided with a metallic dust cap which remains on the container until reaching the customer's filling plant. The packing and placing of the dust caps on the containers is done by automatic equipment and normally four-gallon containers will be packed within a cardboard carton with the top of the carton closed.

The present invention is directed to a method and apparatus for determining whether the dust caps are in place and also will detect whether a container has been placed in the carton upside down.

There is presently available equipment for detecting the presence of caps on containers within cartons; however, these devices require that the caps be formed of a magnetic material in order for the device to be capable of detecting the presence of the caps.

The present invention will detect the presence of caps formed of any metal; magnetic or otherwise.

In view of the foregoing it is an object of this invention to provide a method and apparatus for inspecting cartons within which containers having metallic end closures are packed to determine whether the container and closure are in the proper position.

It is an additional object of this invention to inspect closed cartons filled with containers to determine the presence of metallic end closures by utilizing a microwave reflection technique.

It is a still further object of this invention to provide a method and apparatus for inspecting container filled, closed cartons by utilizing a microwave inspection system and to reject defectively packed cartons.

Other and further objects will be apparent from the following description taken in conjunction with the annexed sheets of drawings, wherein.

Figure 1:
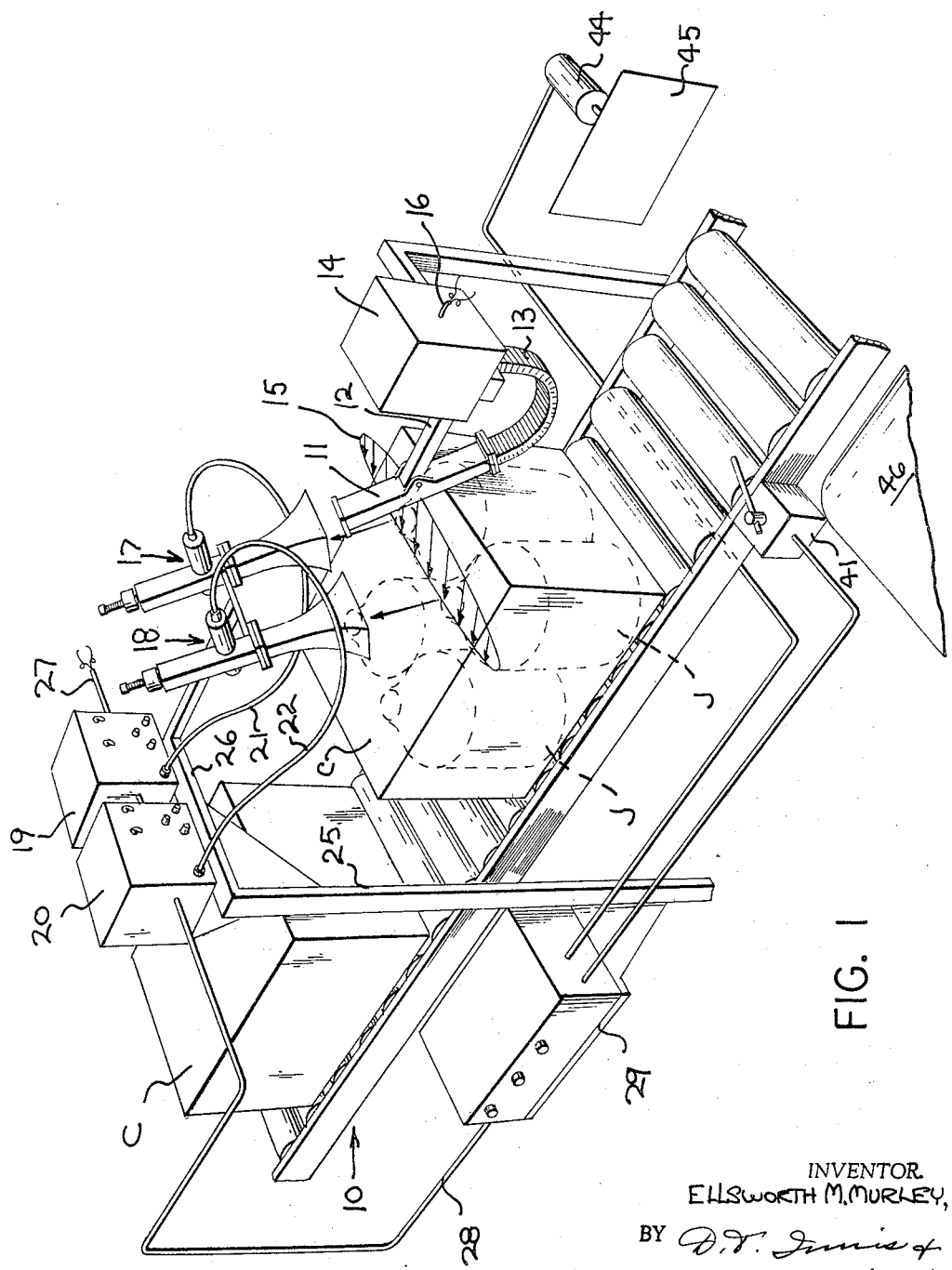
FIG. 1 is a perspective view of the apparatus of the invention.

With particular reference to FIG. 1, the physical arrangement of the inspection apparatus will be described.

As indicated previously, the apparatus of the invention has, as its purpose, the determination of the presence or absence of magnetic end closures on containers packed within closed cartons. The apparatus is intended to operate continuously on a succession of cartons without the necessary attendance of an operator. Cartons "C" to be inspected are placed on a conveyor 10. The conveyor 10 may be of the roller type, such as shown in FIG. 1, or could comprise a constantly moving driven belt-type conveyor.

With the arrangement shown, the cartons may be moved through the inspection system without interference in any way, with the exception that each carton actuates a "read" switch. The conveyor 10 will be substantially horizontal; however, it may be inclined slightly toward the right to assist the movement of cartons therealong in the direction from left to right.

A slot antenna 11 is adjustably mounted on a bracket 12, with the slide end of the antenna 11 connected through a flexible coupling 13 to a klystron signal generator 14. The klystron is operated preferably in the X-band at low power (50–100 mw.) with the output connected to the wave guide slot antenna 11 which produces a fan-shaped beam as illustrated at 15 on FIG. 1. The wave length must be no larger than twice the dimension of the object to be detected. The X-band will cover most articles. The klystron is connected to a suitable source of power through leads 16. With the klystron operating, the wave guide antenna will produce the fan-shaped microwave beam illustrated and its impingement on the cardboard carton will form, in a sense, an illuminated strip across the width of the carton and as the carton moves from left to right, will scan the entire upper surface of the carton. In view of the fact that cardboard is transparent to microwaves, the beam will enter the carton.

As previously explained, gallon jugs "J," for example, shown in dotted line, having metallic caps closing the upper ends thereof will receive the impingement of microwaves thereon and as the microwaves strike the metal caps, they will be reflected upwardly at the same angle as the incident fan-shaped beam. Since the example specifically illustrated shows two containers per width of the carton, it is necessary to provide individual pick-ups or radiation sensing means for each of the two positions of containers.

With this in mind, a pair of horn antennas 17 and 18 are positioned with their open ends directed toward the point of impingement of radiation on the caps within the cartons. The horn antennas, crystal mounts and crystals generally designated 17 and 18 are commercially available types and comprise the pick-up system. The output of the crystal detectors is connected by leads 21 and 22 to amplifiers 19 and 20 and second signal detectors 23 and 24 respectively associated with each individual horn antenna. The klystron 14, which is operating in the X-band, is modulated with 1 kHz. square wave, thus the output of the crystal pick-ups 17 and 18 will also be in the form of a 1 kHz. square wave, with the amplitude of the received signal being proportional to the energy incident on the horn.

For convenience, the amplifiers 19 and 20 are mounted on a support bracket 25 having an arm 26 extending over the run of the conveyor 10. The arm 26 also serves as a support for the pair of horn antennas 17 and 18.

Power for the amplifiers 19 and 20 is supplied through lead 27 connected to a suitable source (not shown). The outputs of the detectors 23 and 24 in the amplifiers 19 and 20 are fed through leads 28 to the signal analyzing circuit components, later to be described, enclosed within the box 29.

Figure 2:
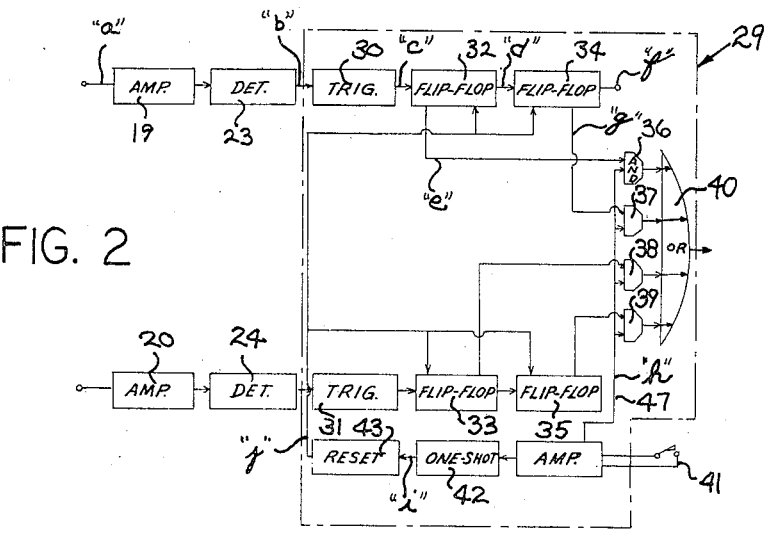
FIG. 2 is a circuit diagram of the electronic apparatus for counting and signalling a reject mechanism; and, FIG. 3 is a drawing of the wave forms of the electronic signals of various points in the circuit of FIG. 2.

With reference to FIG. 2, briefly, the contents of the box 29 comprise a pair of Schmitt triggers 30 and 31 which receive the outputs from the two detectors 23 and 24. The Schmitt triggers in turn are connected to flip-flops 32 and 33. The flip-flops 32 and 33 of the respective input channels are connected to second flip-flops 34 and 35. The cascaded flip-flops in each channel are each connected to "and" gates 36, 37, 38 and 39. The outputs of the "and" gates are all connected to the input of an "or" gate 40. The output of the "or" gate 40 is connected to a suitable reject mechanism. The flip-flops are so arranged that their "0" states are applied to the "and" gate inputs if two caps are present. After the carton has moved to the extent that all the caps contained therein, in the illustrated case two, are viewed by the inspection device, the carton trips a read switch 41. With closing of the read switch 41, a read pulse will be produced and fed to a one-shot multivibrator 42 and to each of the "and" gates 36–39. With the particular arrangement shown in FIG. 3, if all the caps are present, all of the "and" gates will be inhibited and the read pulse will not be transmitted through them.

The output of the one-shot is connected to a reset generator 43 which is connected to each of the flip-flops, it being understood that the one-shot produces the requisite time delay so that the flip-flops are not reset until the read pulse has been received at each of the "and" gates.

If any of the containers fails to have a cap in the proper position, the read pulse will pass the "and" gate and a signal from the "or" gate will be received by a reject solenoid 44 which will drive the reject member 45 against the side of a carton and move the carton from the conveyor 10 to a second conveyor 46 which in turn will carry the defective carton away.

Figure 3:
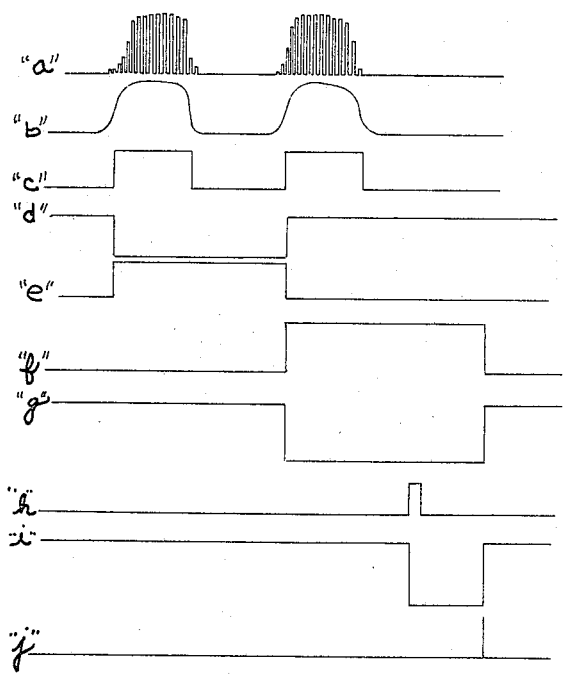

With particular reference to FIGS. 2 and 3, the functional explanation of the gauging circuitry follows. For simplification, a single channel will be described in detail, it being understood that the other channel will be functioning in an identical mode.

For an aid in understanding the invention, the wave-forms of FIG. 3 designated "a"–"j" are applied to the connections of the circuit diagram of FIG. 2 at the leads which carry the signals of their respective wave-forms.

The wave-form "a" of FIG. 3 shows the output of a single horn as it sees two caps when the carton passes beneath the beam. The signal is quite low so that it is amplified by an AC amplifier and detected by a second detector.

The output of the detector is shown in FIG. 3 "b" where it can be seen that the detector smooths the incoming signal. The output of the detector is fed to a Schmitt trigger 30 whose output wave-form is shown in FIG. 3 "c." As can readily be seen when viewing FIG. 3 "c," this output takes the form of a square wave. The two flip-flops 32 and 34 are cascaded and operated in the "T" mode. The wave-forms "d," "e," "f" and "g" show the outputs of the flip-flops.

The flip-flop outputs, as stated above, are fed to a pair of "and" gates 36 and 37. As can be seen from FIG. 3 "e" and "g," the flip-flop "0" states are applied to the "and" gate inputs if two caps are present. If one or no caps were present, one or both of the "and" gates would be armed because either "f" or "g" would not be in its "0" state. After the second cap is read, a read pulse is initiated by the microswitch 41. This will then generate a read pulse which is fed to the "and" gates through lead 47. The read pulse has the wave form shown at "h" in FIG. 3. This is the form of the signal which will be present in lead 47, after the closing of the switch 41.

The output of the one-shot provides a time delay to drive the reset generator. The reset generator is triggered by the positive going edge of the one-shot pulse. The wave-form of the pulse from the reset generator 43 is shown in FIG. 3 "j." Receipt of the pulse shown in FIG. 3 "j" will reset the flip-flops to their original state and the circuit is then ready to gauge the next carton.

In summary, it can be seen that applicant has provided a method and apparatus for inspecting cartons, which contain, for example, bottles with metallic closures thereon, to determine the presence or absence of the requisite number of closures, while the containers are enclosed within a closed carton. The electronic circuitry is designed so that each of the input channels must receive their required signals in order to prevent rejection of the carton. Thus, if for any reason the closures are not in their proper position, such carton will be rejected. As sometimes happens during the handling of the cartons, the dust caps which are normally placed on the containers after their manufacture, become lost or the mechanism for applying the caps fails to supply a cap, there is the possibility in operation of this automatic type machinery that the bottles will be put into cartons and the cartons partially sealed without the error having been detected. Thus the present invention provides a non-contacting inspection system for sorting cartons that contain articles in the defective condition.

It should be kept in mind that while the read switch is specifically disclosed as being a mechanically operated microswitch, that other switching arrangements such as the breaking of a light beam could be utilized to initiate the read pulse.

It should also be kept in mind that while the apparatus is disclosed in connection with the inspection of cartons containing four containers, the principles of the invention would be equally applicable to the inspection of cartons having more or less than four containers. If there were more than two rows, then it would only be necessary to increase the number of receiver antennas and signal analyzing channels, and if more than two containers were in a row, the addition of further flip-flops and "and" gates to accommodate the added number of containers to be counted would be apparent.

I claim:

1. The method of inspecting containers enclosed within a shipping carton for the absence of metal end closures comprising, conveying the cartons in a straight line, in succession through an inspection zone, producing microwave radiation having a wave length less than twice the diameter of the end closure, directing said radiation in a focused beam pattern through the carton at an angle to the surface of said closure, and detecting the presence of a reflected radiation as an indication of the presence of a closure.

2. The method of claim 1, wherein said radiation is continuous and the detection occurs in synchronism with the movement of containers into the field of view of said radiation pattern.

3. The method of claim 1, further including the step of segregating those cartons within which containers without closures are present.

4. The method of claim 1, wherein said cartons contain a plurality of containers and said focused beam of radiation extends across the full width of said carton and said step of detecting comprises detecting at plural transverse locations for viewing each container location in a row transverse to the travel of said carton.

5. Apparatus for inspecting closed cartons containing articles with metal ends comprising, a conveyor for receiving closed cartons in succession, an inspection device positioned above the conveyor and adapted to scan successive cartons, said inspection device comprising a waveguide antenna, a micro-wave source coupled to said antenna, means mounting said antenna with its radiation pattern directed at an angle toward the top of the cartons and extending across the width of said cartons, radiation sensitive means positioned to receiver reflections from the metal ends of articles moving through the effective area of the radiation pattern, and means connected to said radiation sensitive means for rejecting cartons which contain articles without properly located metal ends.

6. The apparatus of claim 5, wherein said cartons contain a plurality of articles and said source of radiation produces a pattern extending across the full width of said carton and separate radiation sensing means are provided for viewing each container location in a row transverse to the travel of said cartons.

7. Apparatus for inspecting closed cartons containing bottles with metal closures to determine the presence or absence of the closures comprising, a conveyor for receiving closed, bottle containing, cartons in succession, an inspection device positioned above the conveyor and adapted to scan successive cartons, said inspection device comprising a wave-guide antenna, a micro-wave source coupled to said antenna, means mounting said antenna with its radiation pattern directed at an angle toward the top of the cartons and extending across the width of said cartons, radiation sensitive means positioned to receiver reflections from the metal closures moving through the effective area of the radiation pattern, and means connected to said radiation sensitive means for rejecting cartons which contain articles without properly located metal closures.

8. The apparatus of claim 7, wherein said radiation sensitive means comprises a crystal detector, means for amplifying the output of said crystal detector, a Schmitt trigger connected to said amplifying means, a pair of cascaded flip-flops connected to the output of said Schmitt trigger, an "and" gate connected to the output of each flip-flop and pulse means actuated in sequence with the passage of a carton through the inspection station connected to said "and" gates.

9. Apparatus for inspecting closed cartons containing bottles with metal closures to determine the presence or absence of the closures comprising, a conveyor for receiving closed, bottle containing, cartons in succession, an inspection device positioned above the conveyor and adapted to scan successive cartons, said inspection device comprising a wave-guide antenna, a modulated micro-wave source coupled to said antenna, means mounting said antenna with its radiation pattern directed at an angle toward the top of the cartons and extending across the width of said cartons, radiation sensitive means positioned to receiver reflected radiation from the metal closures moving through the effective area of the radiation pattern, and means connected to said radiation sensitive means for rejecting cartons which contain articles without properly located metal closures.

10. The apparatus of claim 9, wherein said radiation sensitive means comprises a crystal detector, means connected to said detector for amplifying and converting the output of said crystal detector to a D.C. signal, a Schmitt trigger connected to said amplifying and converting means, a pair of cascaded flip-flops connected to the output of said Schmitt trigger, an "and" gate connected to the output of each flip-flop and pulse generating means actuated in sequence with the passage of a carton through the inspection station and connected as the other input to said "and" gates.

References Cited

UNITED STATES PATENTS

| | | | |
|---|---|---|---|
| 2,472,945 | 6/1949 | Gingrich | 250—223 X |
| 3,155,898 | 11/1964 | Chope | 324—58.5 |

RUDOLPH V. ROLINEC, Primary Examiner

P. F. WILLE, Assistant Examiner

U.S. Cl. X.R.

209—111; 324—67